United States Patent [19]

Taylor et al.

[11] Patent Number: 4,650,139

[45] Date of Patent: Mar. 17, 1987

[54] AEROSPIKE FOR ATTACHMENT TO SPACE VEHICLE SYSTEM

[76] Inventors: Thomas C. Taylor, P.O. Box 1547, Wrightwood, Calif. 92397; Peter Cerna, 2815 California, #4, Dickinson, Tex. 77539

[21] Appl. No.: 636,292

[22] Filed: Jul. 31, 1984

[51] Int. Cl.[4] .......................... B64G 1/64; B64G 1/52; B64C 1/38

[52] U.S. Cl. .................................. 244/161; 244/1 N; 244/130; 244/163; 244/2; 244/135 A

[58] Field of Search ............... 244/158 R, 158 A, 161, 244/163, 130, 115, 117 A, 116, 1 N, 2, 135 A

[56] References Cited

U.S. PATENT DOCUMENTS

| | | |
|---|---|---|
| 2,980,370 | 4/1961 | Takacs . |
| 3,262,654 | 7/1966 | Kaemper ............................ 244/161 |
| 3,268,091 | 8/1966 | Melfor ................................ 244/161 |
| 3,295,791 | 1/1967 | Black ............................. 244/135 R |
| 3,416,758 | 12/1968 | Nicholson et al. . |
| 3,425,650 | 2/1969 | Silva ................................... 244/1 N |
| 3,508,723 | 4/1970 | Warren et al. ...................... 244/161 |
| 3,620,484 | 11/1971 | Schoppe . |
| 3,643,901 | 2/1972 | Patapis . |
| 4,114,836 | 9/1978 | Graham et al. . |

OTHER PUBLICATIONS

Flow-Field Investigation for Large-Angle Cones with Short Spikes at a Mach Number of 9.6, by W. S. Staylor, Apr. 1970.
Results of Tests Using a 0.02-Scale Model, etc., by J. J. Daileda et al., Rockwell International Corp., Sep. 1980 (abstract only).
Aerothermodynamic Data Base; Data File Contents Report, by E. G. Correia, Chrysler Corp., Feb. 10, 1979 (abstract only).
The Ascent Air Data System for the Space Shuttle, by E. R. Hillje et al., 1980.
Space Shuttle Propulsion Issue Stage Combustion Bell Versus Tap-Off or Gas Generator Aerospike, by C. Bendersky, Feb. 3, 1970 (abstract only).
Unsteady Aerodynamic Flow Field Analysis of the Space Shuttle Configuration, etc., by L. Ericsson, Mar. 1976 (abstract only).
Scale Effects on the Fluctuating Pressures in a Region of Spike-Induced Flow Separation, by J. P. Redding et al., Jan. 1979.
Fluctuating Pressure Environment of a Drag Reduction Spike, by R. A. Guenther et al., Jan. 1977.
Asymmetric Shock-Wave Oscillations on Spiked Bodies of Revolution, by A. Demetriades et al., Nov. 1976.
Effect of a Spike on the Drag and on the Aerodynamic Stability of Blunt Bodies in Supersonic Flow, by J. Rom et al., Aug. 1970.
Steady Loads on Spiked Blunt Bodies of Revolution, by L. E. Ericsson, Nov. 30, 1962 (abstract only).
Development of the Trident I Aerodynamic Spike Mechanism, by Mark D. Waterman and B. J. Richter, Lockhead Missles in Space Company, 1979, Document No. 3, Contract No. 5845.
Effect of External Tank Nose Shape on the Rockwell International Space Shuttle Vehicle 3, by E. C. Allen, 1974.

Primary Examiner—Galen Barefoot
Attorney, Agent, or Firm—Sandler & Greenblum

[57] ABSTRACT

An aerospike is adapted to be attached to the front nose of an aerodynamically asymmetric space vehicle system, such as the external tank and orbiter of the space shuttle. The aerospike basically comprises a tapered elongated portion having a first end which is adapted to be attached to the nose of the space vehicle, and a second free end terminating in a substantially rounded disc-like tip member. Use of the spike reduces aerodynamic heating and drag during ascent of the space vehicle into its orbital position, provides an attachment point for tether operations and for propellant recovery, and permits transportion of an external tank into its orbit.

19 Claims, 15 Drawing Figures

OTHER PUBLICATIONS

Effects of External Burning on Spike-Induced Separated Flow, by J. Redding et al., Aug. 1982.

Investigation of Self-Sustained Shock Oscillations on a Spike-Tipped Body at Mach 3, by W. Calarese, et al., Nov. 1981.

Modes of Shock-Wave Oscillations on Spike-Tipped Bodies, by W. Calarese, et al., Jan., 1983.

Flow Visualization and Data Analysis of Self-Sustained Shock Oscillations on a Spiked Body at Mach 3, by W. Calarese, Sep., 1981.

Unsteady Aerodynamic Considerations in the Design of a Drag-Reduction Spike, by J. P. Redding et al., 1976.

External Tank Nose Shape Study, by C. C. Dill et al, Jun., 1973.

Non-Stationary Separation on Spiked Bodies—in Supersonic Flow, by A. N. Antonov (U.S.S.R.) et al., Jan. 1979.

Flow over Blunt Bodies with Spikes and Cavities, by V. M. Davydov, Oct., 1979.

AEROSPIKE FOR ATTACHMENT TO SPACE VEHICLE SYSTEM

GOVERNMENT CONTRACT

The U.S. Government has a paid-up license in this invention and the right in limited circumstances to require the patent owner to license others on reasonable terms, as provided for by the terms of Contract No. F33615-83-C-3614, awarded by Dept. of the Air Force, Air Force Systems Command, Wright-Patterson, AFB, Oh 45433.

BACKGROUND OF THE INVENTION

1. Field of the Invention

The present invention generally relates to space vehicles, and more particularly to asymmetrical space vehicle systems having an aerospike attached to the nose of an external tank in order to alter the aerodynamic effect on the entire vehicle during space flight and on-orbit benefits. The present invention is particularly adapted for use with aerodynamically asymmetric vehicles such as the space shuttle, and shuttle derived vehicles, although its principle of operation can also be appliedk to symmetric vehicles.

2. Discussion of Prior Art

Numerous attempts have been made in a variety of vehicles to alter the aerodynamic flow around the vehicles by using an elongated or spiked element on the nose thereof.

NICHOLSON et al., U.S. Pat. No. 3,416,758, discloses a self-balancing spike control which is adapted to provide a system for orienting a spike or rod at the nose of an aircraft so that the fluid shock cone will be positioned to completely protect the nose or leading edge of a supersonic vehicle. The apparatus is adapted to be positioned on a supersonic vehicle nose tube which is misaligned with an airstream. A spike is positioned on the front of the nose and can be angled to form a protective cone which completely encloses the region to be protected. The spike forms a uniform region which prevents turbulent hot-spots from occurring at or near the surface of a window. By positioning the spike or rod upstream of the window or sensor, the airstream is diverted to protect the window from undue heating and erosion.

PATAPIS, U.S. Pat. No. 3,643,901, discloses a ducted spike diffuser for reducing drag and erosion of blunt bodies which operate at supersonic speeds. A diffuser is attached to a radome and is mounted on a spike shank. A bow tip shock results at a detached position forwardly of the diffuser and continues outwardly therefrom.

SCHOPPE, U.S. Pat. No. 3,620,484, discloses a method and apparatus of reducing shock waves created by solid bodies moving at supersonic speeds. The apparatus for reducing the shock wave, drag and sonic boom uses a thermodynamic cycle. By using a small-diameter gas tube or pipe which protrudes from the front of the body, the nose of the small body will generate relatively low shock waves. If no combustion occurs, the head end of the main body will generate an additional strong shock wave in conventional fashion. This will serve to maintain air located around the nose of the supersonic body and may also serve to eliminate the sonic boom which accompanies shock waves.

GRAHAM, U.S. Pat. No. 4,114,836, discloses an aircraft which has a nose configured to reduce drag and sonic boom. The aircraft has a fuselage, wings, a horizontal elevator, and a rudder. A plurality of passageways extend through each wing section and diverge from the front towards the rear of the vehicle. The longitudinal axes of the passageways are aligned with the flight path, insofar as possible.

TAKACS, U.S. Pat. No. 2,980,370, discloses a supersonic flying body which includes a nose having the outline of a cone. A stepped portion is provided behind the nose together with a cylindrical neck for connecting the nose to the trunk or body of the flying craft. The nose is comprised of a material which is sufficiently resistant to heat and vibration in order to withstand the stresses which exist at supersonic speeds. If the flying body moves at a speed greater than the speed of sound, compressed waves will be produced at the nose in a gas, e.g., air, which surrounds the flying body. These waves will diverge in the direction of a generating surface of the nose. The flying body will thus be surrounded by an envelope of highly compressed gas which will protect the flying body from external influences, such as missiles, which will be warded off of their courses by the action of the potential current that is generated about the flying body.

Additionally, an aerospike has been used in conjunction with Trident II submarine launched ballistic missiles. This aerospike comprises a telescopic boom section which is extended, upon generation of a gas, from the curved nose fairing of a symmetrical Trident missile. The end of the boom section in each of these missiles comprises a flat, generally discoidal shaped object.

None of the prior art which is listed above discloses an aerospike which can be attached to an aerodynamically asymmetrical vehicle nor which can vary in length as a function of changing aerodynamic regimen in order to enhance aerodynamic flow, reduce drag, and increase vehicle drag. Further, none of the prior art discloses the use of an elongated spike having a rounded disc-like tip at an outer end thereof and which has an optimized length.

OBJECTS OF THE INVENTION

Accordingly, it is a general object of the present invention to provide a new and improved spike adapted to be attached to the nose of the external tank of a space transportation system such as the space shuttle.

Another object of the present invention is to provide a new and improved aerospike adapted to be attached to the nose of an asymmetrical space vehicle and which is adapted to reduce aerodynamic heating and drag on the vehicle during its ascent to orbit.

Still a further object of the present invention is to provide an aerospike adapted to be attached to the nose of a space vehicle which will alter the aerodynamic flow about a vehicle such as the shuttle orbiter.

Yet another object of the present invention is to provide a new and improved aerospike which will enable a space vehicle to have reduced insulation yet maintain aerodynamic heating, drag, and thrust at relatively low levels.

A further object of the present invention is to provide a new and improved aerospike which is adapted to be attached to a space vehicle which will permit more payload weight to be taken into orbit with an equal amount of propellant and hardware.

Still an additional object of the present invention is to provide a new and improved aerospike adapted to be attached to the front of a space vehicle which is adapted to produce a flow change about a three component, aerodynamically asymmetrical vehicle system, and which can vary in length as a function of changing aerodynamic regimen during ascent.

Yet a further object of the present invention is to provide a new and improved aerospike which is adapted to be attached to the front of a space vehicle which is provided to retard or minimize the reattachment of shock waves during the flight of a space vehicle.

Still a further object of the present invention is to provide a new and improved aerospike which is adapted to be attached to a tether in order to allow a vehicle to be attached to a space facility located in a higher orbit and to be pulled into such a higher orbit by the tether.

The above and other objects of the present invention will become more fully apparent to those of ordinary skill in the art upon further review of this application.

SUMMARY OF THE INVENTION

The present invention is provided for in a first aspect thereof by an aerospike which is adapted to be attached to the nose of an aerodynamically asymmetrical space vehicle system. The aerospike comprises an elongated portion having a first end adapted for attachment to the vehicle nose and a second end which is positioned away from the nose. The aerospike further comprises either a flat-face rounded disc, or a substantially conical, tip member, both of which can be integrally formed with the first end of the elongated portion. The space vehicle comprises an orbiter, an external tank and two solid rocket boosters which are attached to the shuttle. The aerospike comprises means for changing the aerodynamic heating of the tank during ascent of the vehicle into its orbital position, and it is approximately fifteen feet long when optimized for the external tank diameter. The front of the vehicle can terminate in a flat, generally annular portion which is attached to one end of the aerospike.

The elongated portion and the tip can be attached to the tip of a frustoconical cap member which is attached to the space vehicle. The external tank can have a blunt nose to which the elongated portion is attached, and the spike can be either flexible or rigid. The aerospike may also include means for emitting a fluid from the tip member to enhance aerodynamic flow about the space vehicle. The fluid can be a gas or liquid, and a hydraulic deployment device can be provided in the vehicle to deploy the spike after vehicle launching. The elongated portion can thereby be moved from a first position in which the portion is located within the vehicle tank into a second position in which the portion extends outwardly from the vehicle tank. The elongated portion may comprise a plurality of decreasing diameter, telescoping sections, which are substantially cylindrical and which decrease in diameter in a direction away from the vehicle nose. The emitting means comprise means for retarding reattachment of any shock waves which are created by movement of the space vehicle, and can include a fluid source and a fluid-conducting channel which extends through the conical or rounded disc-like tip and at least a part of the elongated portion.

BRIEF DESCRIPTION OF THE DRAWINGS

The above and other objects, features and advantages of the present invention will become more fully apparent to those of ordinary skill in the art to which this invention pertains from a review of the specification and attached drawings, common reference numerals being used throughout the drawings to describe similar parts, wherein.

DETAILED DESCRIPTION OF THE DRAWINGS

Figure 1:
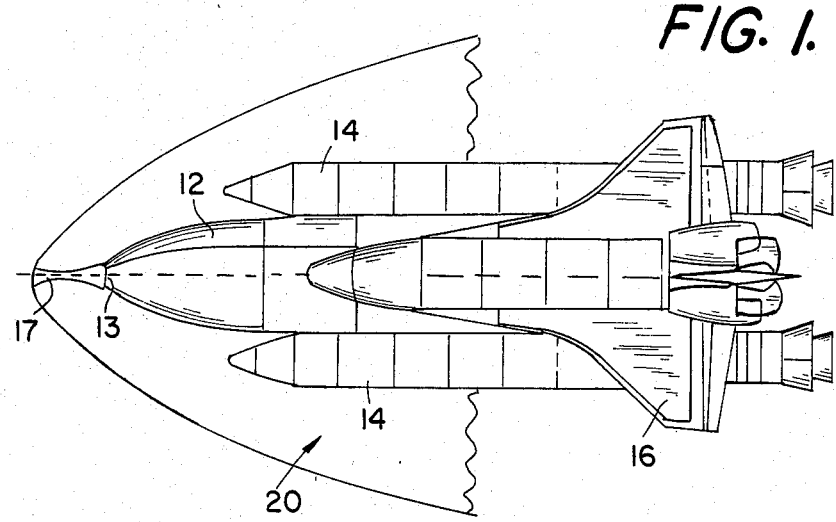
FIG. 1 is a top plan view of an aerospike attached to the external tank of an asymmetric space vehicle system.

FIG. 1 illustrates a space vehicle system 10 incorporating the basic concept of the present invention, which provides for an elongated spike 17 at the forward end of an external tank 12. The spike has a stem/elongated portion 18 and a tip 20, and is provided to alter the aerodynamic flow about asymmetric vehicles or vehicle systems, such as the space shuttle, in order to reduce aerodynamic drag on the vehicle; it can, however, also be used with symmetrical vehicles, although it is not as important or beneficial when used with such systems. By providing a spike attached to the nose of the vehicle in accordance with the present invention, e.g., a spike having a length L (see FIG. 4) of approximately fifteen feet, the asymmetric spacecraft configuration will react as if it is longer than it really is with respect to its aerodynamics, which will effectively lengthen the range of the spacecraft. Range will be increased as a result of a reduction in aerodynamic drag, which in turn increases the payload weight and/or vehicle diameter which can be carried.

Space transportation system or vehicle 10 includes a space shuttle external tank 12 attached to an orbiter 16, with two rocket boosters 14 attached to opposite exterior walls of the tank. Shuttle orbiter 16 is attached to the upper surface of external tank 12. Aerospike 17 is attached to nose 13 of the external tank; and the nose is preferably manufactured in a flat or blunt fashion to facilitate attachment to aerospike 17, e.g., by welding, by attachment to an existing bolt ring.

Figure 2:
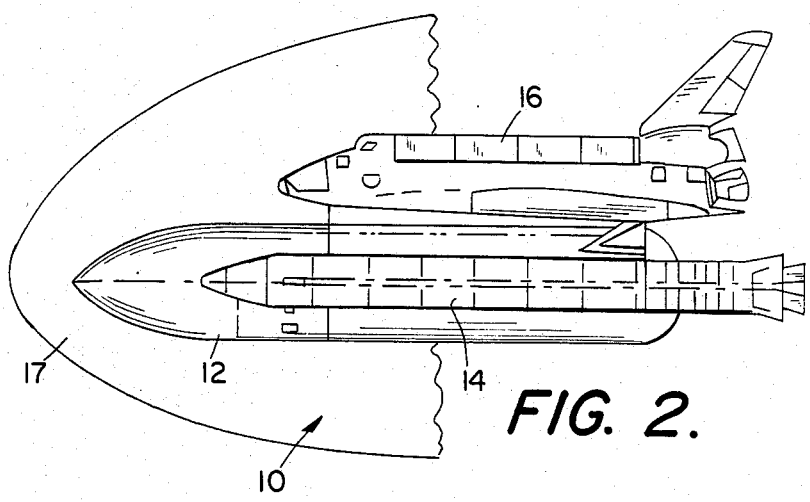
FIG. 2 is a side plan view of the space vehicle of FIG. 1 including the aerospike, and illustrates aerodynamic flow about the vehicle.

FIG. 2 is a side view illustrating the altered airflow region created by the presence of aerospike 17; the flow is directed about the upper and lower surfaces, and about the sides, of space vehicle transportation system 10. The provision of orbiter 16 atop tank 12 converts the vehicle system into an asymmetric structure.

Figure 3:
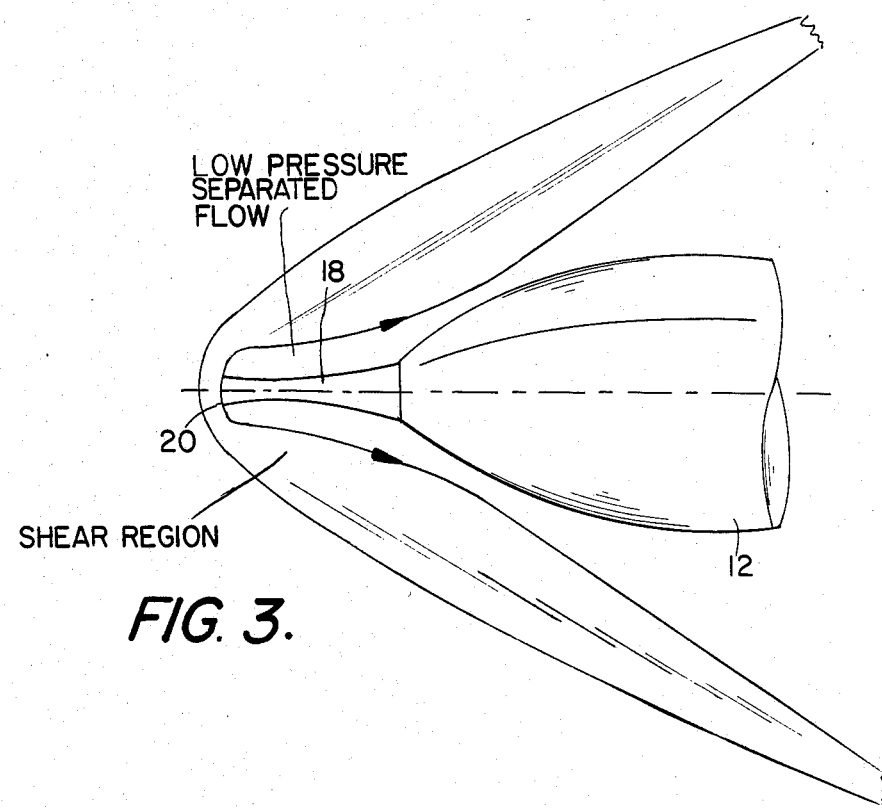
FIG. 3 is a perspective view of a blunt nose on a space vehicle to which is attached an aerospike formed in accordance with the present invention.

FIG. 3 is a close-up perspective view of tip 20 and elongated portion 18 of aerospike 17, which is attached to the external tank (ET) 12. The nose of external tank 12 is provided as an essentially flat surface 13, to which a first end of the aerospike is attached, either by welding or by suitable (and conventional) attachment elements. The aerospike comprises a tapered, elongated member 18 having an essentially rounded disc-shaped tip member 20 at its second end, the tip member being located at an end of portion 18 which is distant from the nose of tank 12. The rounded disc member has a generally flat base portion attached to the second end of the elongated member and its tip is positioned at the front of the vehicle. The disc has an outer curved surface 20a which directs flow about the tank. In this fashion, as illustrated in FIG. 3, the tip of the aerospike serves to create a shock wave when the air flow encounters the moving tank, and segregates the aerodynamic flow from the shock wave which is produced by movement of the external tank. The direction of the separated flow is illustrated by the arrows in FIG. 3. The shear and low pressure flow regions are also shown and labelled in this Figure.

The flat-faced rounded front disc 20d aerospike 17 has been selected because wind tunnel tests on an already streamlined external tank model showed that the use of such a tip provided drag reduction of approximately twenty-two percent, and that approximately a fifty-three percent reduction in drag was achieved by placing a flat-face rounded front disc aerospike on a hemispherical model. This has an important future potential insofar as the president's strategic defense initiative is intended to provide a new class of space vehicles which include larger diameters and blunter, potentially hemispherical noses. Thus, a drag reduction of twenty-two and/or fifty-three percent for these vehicles will be an important factor in the development. While the present invention also contemplates the use of a conical tip, wind tunnel tests have proven the rounded disc to be significantly more effective in reducing drag.

Figure 4:
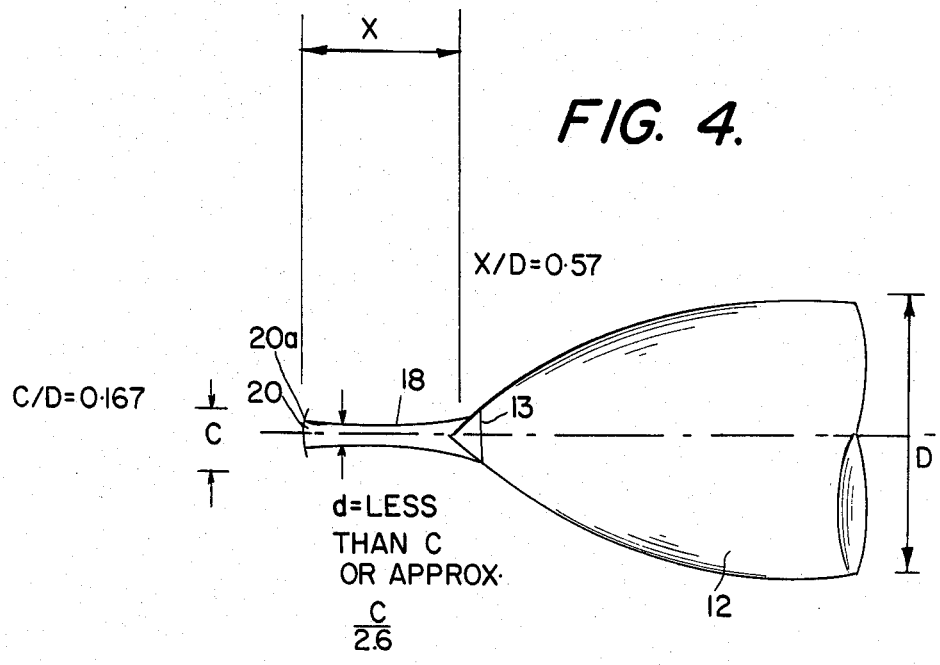
FIG. 4 is a perspective view of the blunt nose of a vehicle, also illustrating the tapered walls of the elongated aerospike portion and a tip in the form of a disk with a generally rounded surface.

FIG. 4 further illustrates the approximate size of the surface of the aerospike member 20 with respect to the central axis of the external tank 12. The dimensions are based upon preliminary/feasibility wind tunnel tests, and were optimized only for the external tank, and not for the entire vehicle. The dimensions of an aerospike for a complete launch vehicle, such as those shown in FIGS. 1, 2, 5 and 14, are expected to be longer. Although the spike illustrated in FIGS. 1-4 appears to be relatively rigid, it can be an ablative or eroding spike which changes shape during ascent of the space transportation system, in accordance with the changing aerodynamic regimen encountered by a vehicle during such ascent.

Alternately, as illustrated and described in greater detail hereinafter with respect to FIG. 9, the spike can be a "fluid ejection" spike which introduces beneficial liquids or other fluids into the altered flow region about the front or nose of the external tank.

Figure 8:
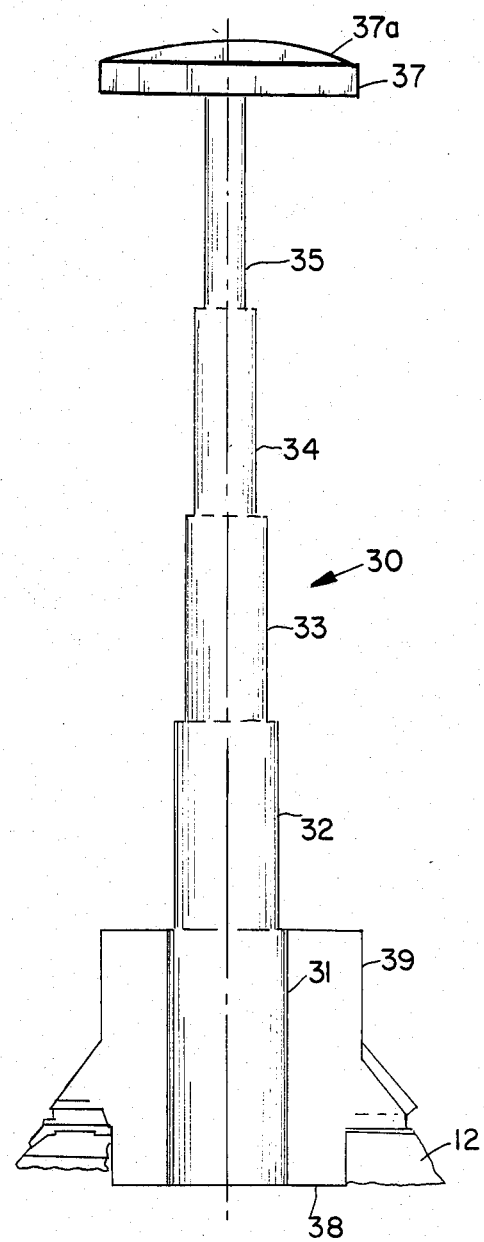
FIG. 8 illustrates another embodiment of an aerospike in which the elongated portion comprises a plurality of telescoping sections.

As illustrated in FIG. 8, the aerospike can also be an essentially telescopic spike which is deployed after launch of the vehicle in order to minimize launch pad modification (which would otherwise be necessary to accommodate the outwardly protruding spike) yet attain all of the advantages which result from use of a spike. In this embodiment the aerospike can be deployed, by suitable (and conventional) hydraulic or mechanical apparatus, from a first position in which it is located within tank 12, to a second position in which it extends outwardly from the nose of the tank. It also illustrates the rounded outer surface of disc tip member 37, the curvature of which can be varied in order to obtain maximum aerodynamic effect.

Figure 5:
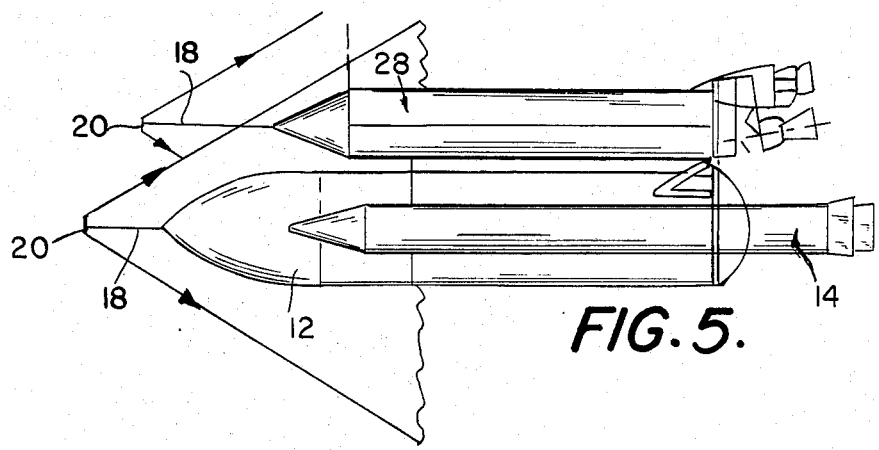
FIG. 5 is a plan view of a second embodiment of the present invention, in which the aerospike is attached to both an external tank and to an SDV (Shuttle Derived Vehicle) payload carrier which is attached to an upper wall of the external tank, the aerodynamic flow illustrated as being directed about the two vehicles.

FIG. 5 illustrates an embodiment 81 of the present invention in which tank 12 and SDV P/L (Shuttle Derived Vehicle Payload) compartment 82 are provided with identical spikes 17 attached to respective nose portions of the tank and the SDV payload compartment. This arrangement is notable for the advantageous interaction between the altered aerodynamic flows created by the two aerospikes.

Figure 6:
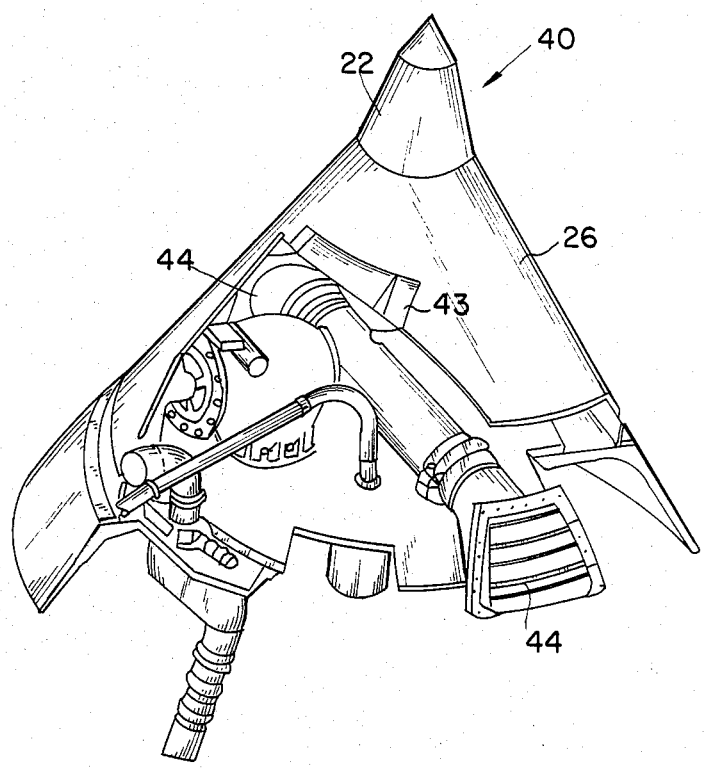
FIG. 6 is a cutaway perspective view a 40° cone nose with a lightning rod attached to an the existing external tank.
Figure 7:
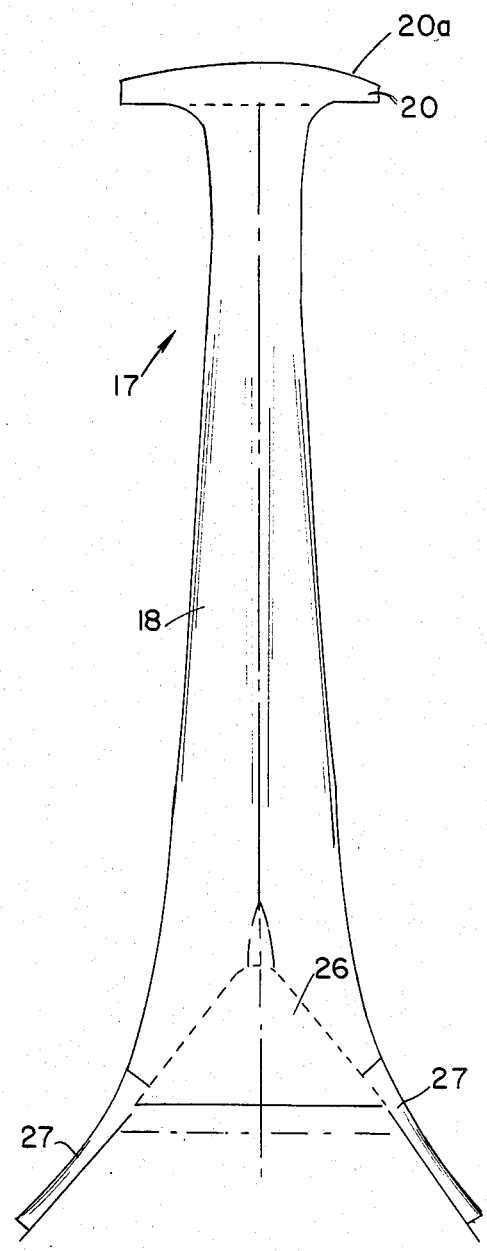
FIG. 7 is a perspective view showing a frustoconical cap for an external tank and a portion of an aerospike with a tapered elongated portion which is attached to the cap.

FIG. 6 illustrates a lightning rod 22 which is adapted to be attached to the front conical tip portion 26 of a nose cone 40; the nose cone can be utilized to attach an elongated aerospike 17 to a vehicle tank, as in FIG. 7. The cone comprises a major conical section 26 (at 40°) which is adapted to be attached to the front portion of an external tank. This conical section is a truncated cone, preferably having a 78.76° angled surface and being 27.74 inches long; and it has a relatively thick skin, preferably 0.08 inches at a minimum. The skin is stabilized by a plurality of frames and a collar (not shown) engaging the cone at a 20° cone interface. The cone is adapted to be attached to two stainless steel louvers 44 on opposite sides of the cone which are part of a lithium oxide venting system. An aerodynamically faired penetration for an electrical cable tray can be provided, and apertures/recesses 43 are provided about the periphery of truncated cone 26.

FIG. 7 illustrates the aerospike, which is formed of composite materials; it comprises a fiber wound thin shell tapered support shaft 18 with an aerospike tip 20 attached to its forward end. The aerospike can be attached to cone 26, as shown, although it is preferable to attach the aerospike directly to the nose of an external tank. A composite nose Thermal Protection System (TPS) cover 27 is a field attached closd-out member which is used to bolt or otherwise connect the aerospike to cone 40. The fastening elements or welds used to attach cover 27 to cone 26, and to aerospike 17, are conventional, and are therefore not apecifically illustrated.

FIG. 8 illustrates another embodiment of the present invention, in which aerospike 30 comprises a plurality of sections 31, 32, 33, 34, and 35, provided in telescoping fashion and increasing in diameter as they approach the tank. This aerospike also incorporates a curved, generally disc-shaped tip 37 with curved outer surface 37a, which is virtually identical to the tip 20 of aerospike 17. This telescoping aerospike can be activated into the extended position of FIG. 8 after launch, when the speed of the space transportation system is near mach 1.0 and subsonic detrimental effects are at a minimum. Prior to activation, it is retained within a container bounded by walls 38 and 39, and is positioned inside tank 12, which is covered by a plate. This telescoping system can be activated by a conventional hydraulic system such as described in the article "Development of the Trident I Aerodynamic Spike Mechanism" referred to previously. This article is incorporated by reference herein, and it describes, at pages 41–42, how deployment of a telescoping spike can be provided. This deployment can be accomplished by internal pressures created by a solid propellant gas generator. Alternately, the system can be activated by any conventional mechanical, hydraulic, or pneumatic system.

Figure 9:
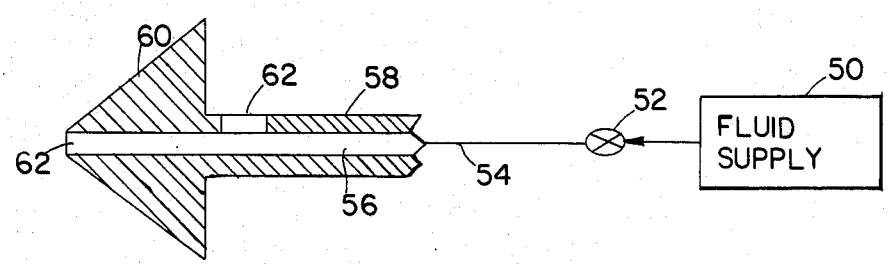
FIG. 9 is a cross-sectional view of yet another embodiment of an aerospike in accordance with the present invention which includes a central chamber for emitting or injecting fluid in order to alter the aerodynamic flow characteristics about the tip of the aerospike.

FIG. 9 illustrates yet another embodiment of the present invention, in which elongated portion 58 of an aerospike includes a central hollow chamber 56, which receives a fluid conveying line 54, which is in turn attached to a fluid supply 50; outlet port 62 of chamber 56 is positioned at the peak of conical tip 60 in order to emit or dispense, when desired, a fluid through the tip to improve aerodynamic flow of fluid about the tip. Fluid is delivered to line 54 from fluid supply tank 50 in a selective fashion which is controlled by valve 52.

Figure 10:
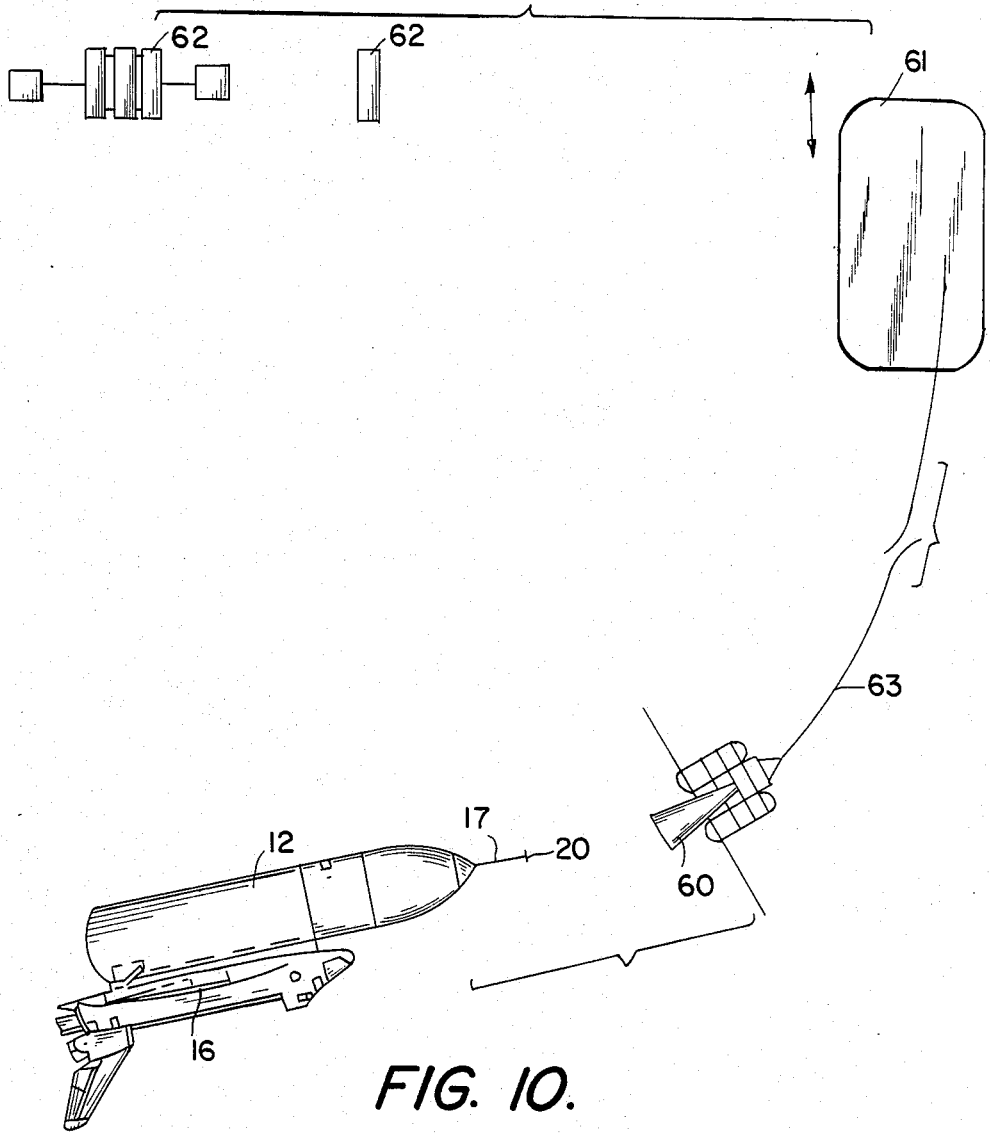
FIG. 10 is a plan view of another embodiment of the aerospike, in which the aerospike structure is used as the attachment link for a tethered space transportation system.

FIG. 10 illustrates use of aerospike structure 17 as the attachment link to tether a vehicle to a rendezvous module 60 of a space transportation platform system 61. The system 61 supports orbital platforms 62; and aerospike 17 is coupled to the rendezvous module 60 and pulled into a higher orbit by tether cable 63.

Figure 11:
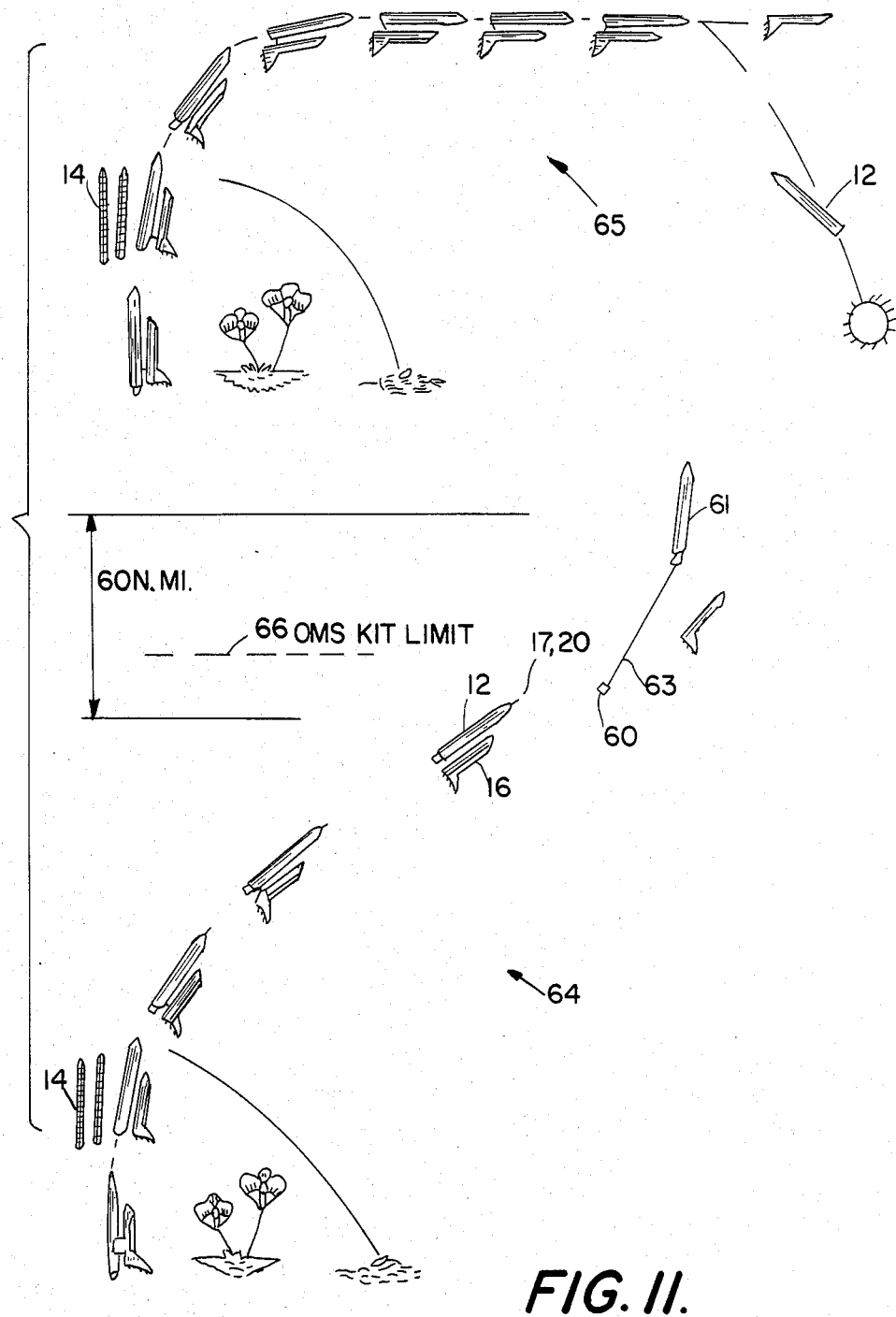
FIG. 11 illustrates, in cross-section, another use of an aerospike and tether, which will improve present space transportation system.

FIG. 11 illustrates the use of an aerospike/tether concept as part of a space transportatiokn systems 64 which will a present STS mission vehicle 65. The changes include an increase in payload weight of the space system, due to better drag reduction, and the attainment of a higher orbital altitude. The external tank 12 can be taken to an orbit higher than the present OMS kit limit, illustrated in FIG. 11 at 66. ET is later deorbited for additional energy.

Figure 12:
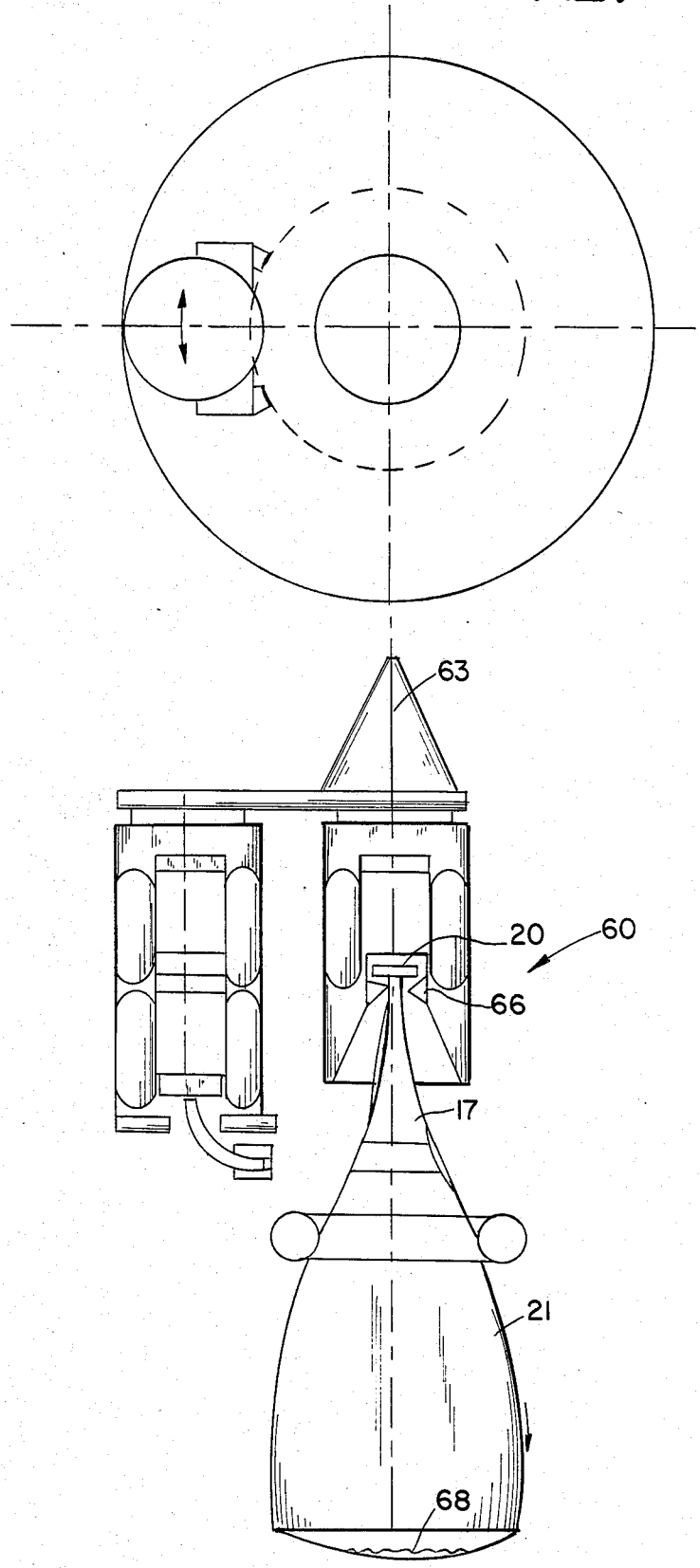
FIG. 12 is a cross-sectional view of an attachment for connecting the aerospike and a tether cable.

FIG. 12 is a cross-sectional view of rendezvous module 60, which uses an attachment mechanisms 66 to grip aerospike 17 and to form a structural connection which is capable of supporting approximately 1000 KG. This permits tether cable 63 to pull up the external tank 12, orbiter 16, and rendezvous module 60, and to provide a settling force sufficient to maintain adquately the cryogenic propellants 68 in the aft part of the external tank. The aerospike 17 and tether cable 63 permit the transfer of propellants 68 by gravity.

Figure 13:
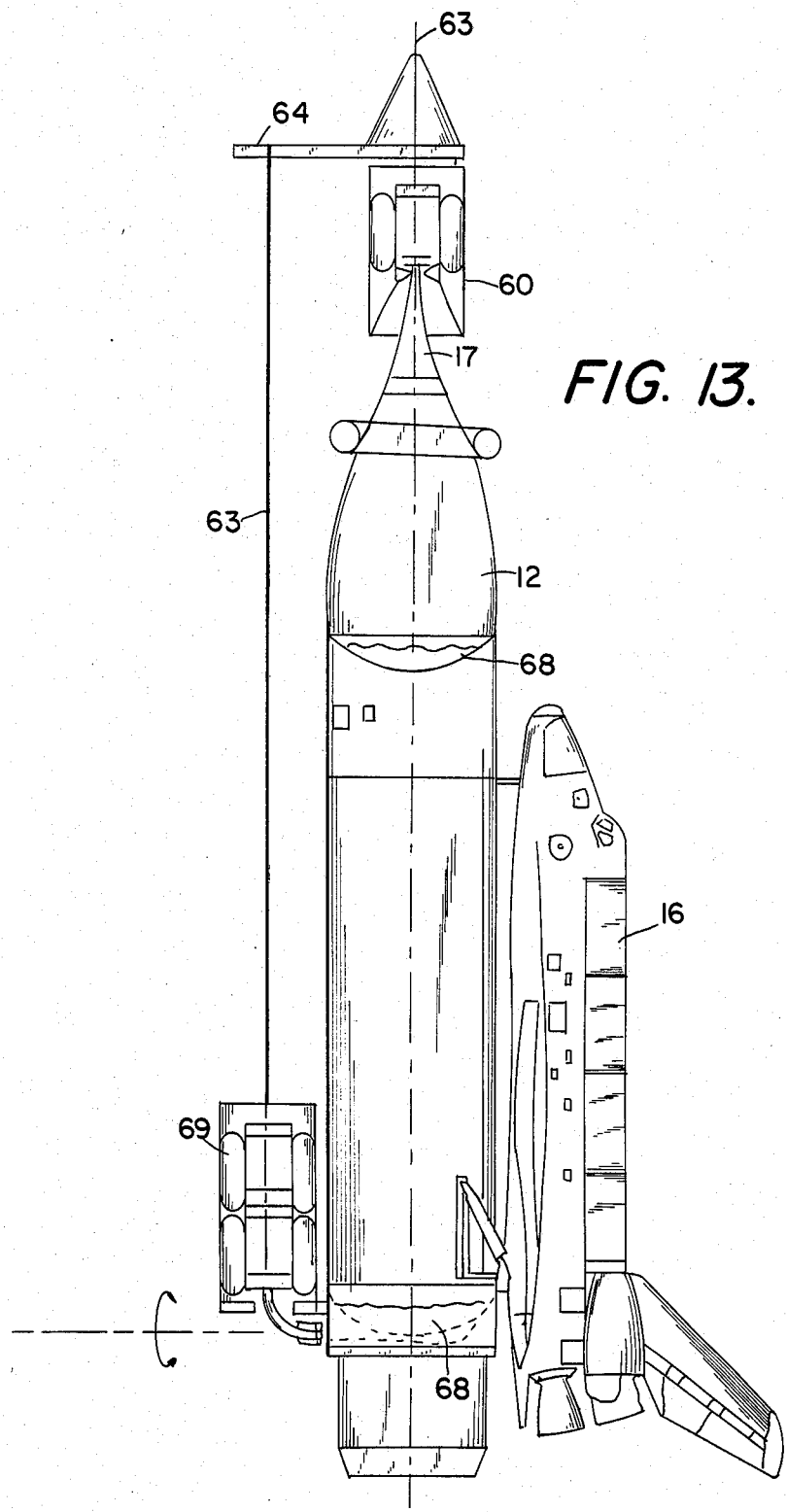
FIG. 13 is a cross-sectional view of yet another use of an aerospike in accordance with the present invention which includes a device for transferring propellant which is attached to the aerospike via the tether system.

FIG. 13 is a cross-sectional view of yet another use of an aerospike 17 in accordance with the present invention; this includes the transfer of propellant 68 while aerospike 17 provides attachment of a recovery until 69 to an aerospike via plate 64 and a tether cable 63. Residual propellants 68 are recovered into a propellant recovery unit 69 by gravity flow means while supported by one cable 63.

Aerospike 17 provides the additional capability of transporting an increased payload weight of a space vehicle and permits the entire system to be more efficient by enhancing drag reduction and permitting the use of heavier and wider payloads with a predetermined amount of fuel than would otherwise be possible with vehicles lacking aerospikes.

Figure 14:
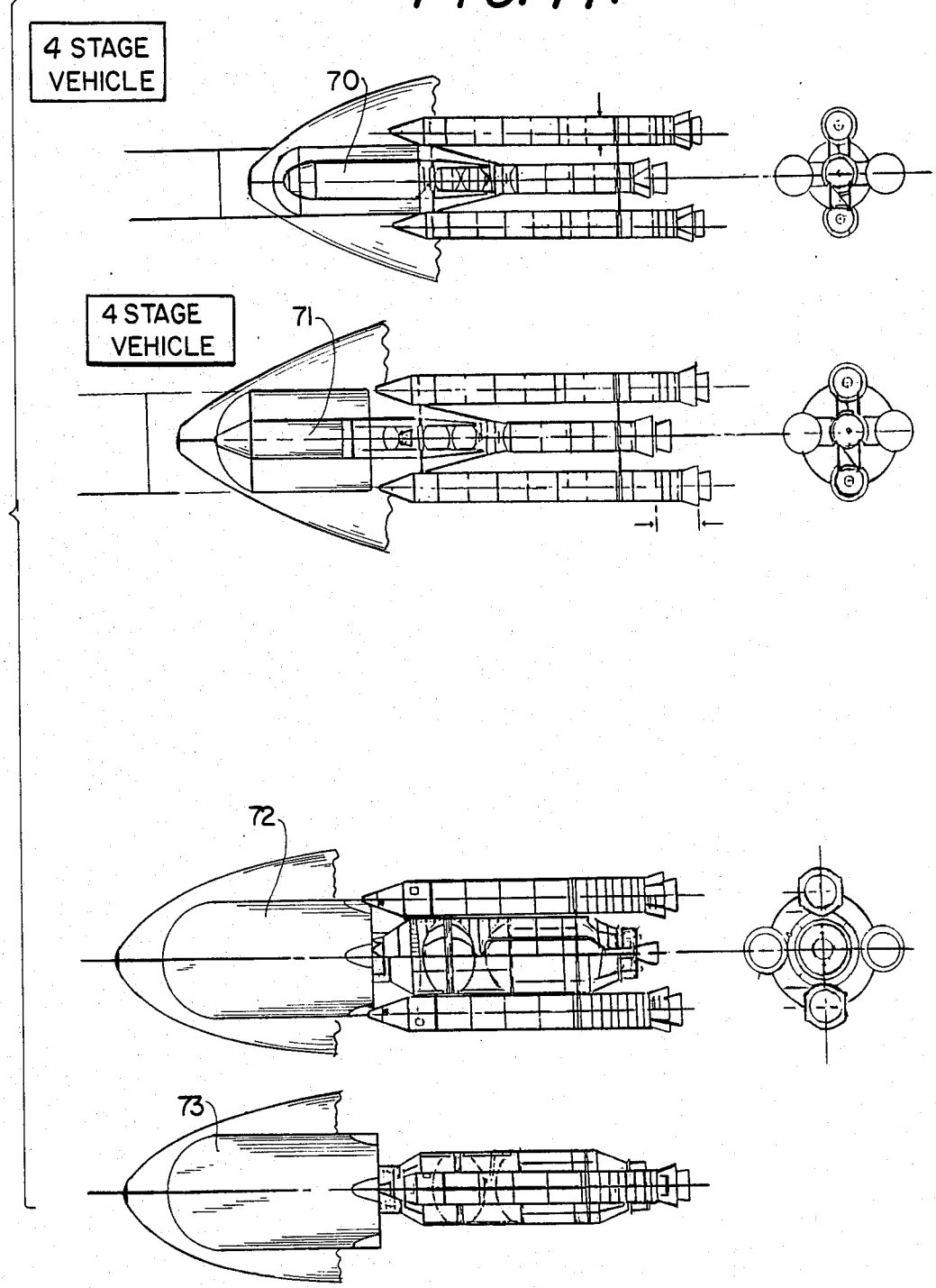
FIG. 14 schematically illustrates another use of the aerospike in accordance with the present invention which permits the use of larger diameter and payload space vehicles.

FIG. 14 illustrates another use of an aerospike 17 in accordance with the present invention which enhances payload diameter capability by permitting a larger payload on future government space vehicles 70, 71, 72, and 73. These vehicles are enhanced by reducing the aerodynamic drag of the space vehicle and by increasing the diameter of the payload carried.

Figure 15:
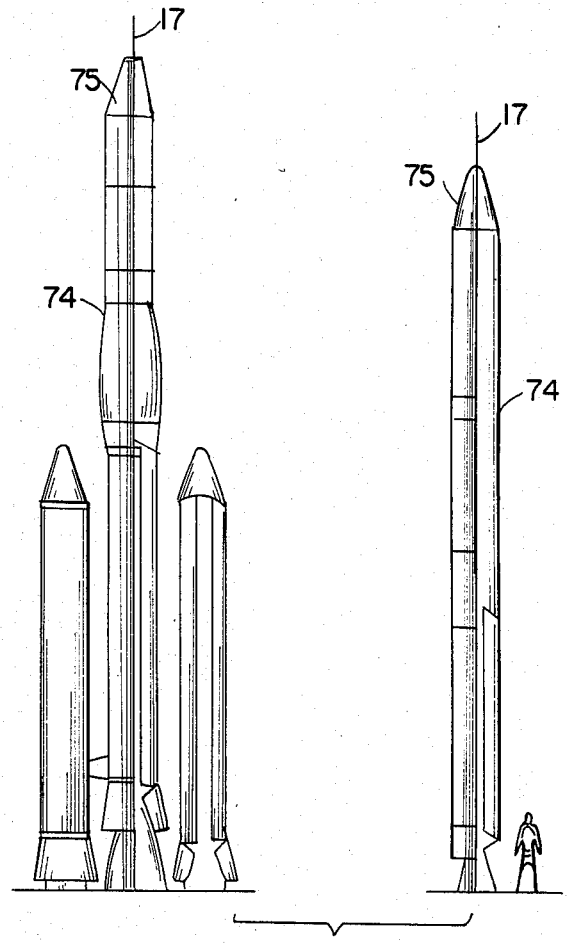
FIG. 15 illustrates two additional uses of the aerospike, in combination with a "Conestoga 2" space vehicle and with a "Dolphin" space vehicle.

FIG. 15 illustrates another use of an aerospike 17 which enhances the capability of several privately financed space vehicles 74. These commercial vehicles are provided with a method of approaching space facilities 61 and 62, as in FIGS. 10 and 11, without the expensive rendezvous systems now required to approach a space station in orbit. A space vehicle, built witin an expensive shroud 75, should have aerodynamic streamlining which minimizes the aerodynamic drag. The aerospike permits a less expansive and more hemispherical nose shroud assembly and will have a benficial impact on cost for that reason.

The space transportation system which incorporates an aerospike on the nose of the external tank generally also includes an orbiter, solid rocket boosters, and an external tank, as illustrated in FIG. 1. The components are generally held together by attachment to the external tank and are launched into orbit. During the eight to ten minutes that it normally takes for the sytem to attain its orbit, the components will together accelerate from the launch pad to a speed of approximately 25,000 miles per hour. Much of this acceleration occurs in the dense atmosphere close to the surface of the earth, which often causes the system to heat and be adversely affected by aerodynamic drag. The use of the elongated aerospike alters the airflow about the system and accordingly reduces the aerodynamic heating, and drag, of the vehicle. Reduction of the aerodynamic drag in turn reduces the thrust required for the system to attain its orbit, and permits more payload weight to be taken into orbit using the same amount of propellant and hardware.

Several embodiments of the aerospike are contemplated, as discussed previously, which have either a rounded disk-type tip (preferably) or a conical tip, including a water or other fluid-injected spike (FIG. 9) in which fluid is injected from the spike at the highest stress time span, i.e. "Max Q", in order to maximize the reduction of aerodynamic heating and drag. Similarly, an ignited spike, which gives off particles or gas, will add to such benefits. The spike can either be a soft and flexible spike, or a relatively hard and rigid spike. As shown in FIG. 8, the spike can be telescopically deployed from the external tank nose cap immediately after launch of the vehicle, or it can comprise a static pole having a portion which protrudes from the external tank.

The external tank of this transportation system experiences a temperature of approximately 1,200° F. during its ascent to orbit. Accordingly, the external tank generally incorporates a thermal protective system which weighs approximately 4,000 pounds, which the aerospike should be able to reduce by minimizing aerodynamic heating of the tank.

When the shuttle or space system passes through the "max Q", or maximum dynamic pressure region, during its ascent into orbit, the system undergoes a point of maximum stress which the enhanced aerodynamic flow resulting from an aerospike manufactured in accordance with the present invention should relieve. The aerospike-equipped vehicle systems should reduce aerodynamic pressure and hopefully decrease the throttle down now required.

Presently, the optimum length of the aerospike is not known, but it should vary in accordance with the mach number, with the maximum benetfit expected to be attained between mach 0.7 and mach 4.0. It is in this mach region that the maximum atmospheric density will be experienced.

The aerospike can be formed with a tapered cross section (see FIG. 7) to increase its strength and reduce its weight. It could equally well be used with other asymmetrical space vehicles and systems, and can be used in conjunction with a tether system for attaching a space vehicle to a space station. As illustrated in FIG. 5, when the elongated aerospikes are attached both to the space shuttle and to an attached cargo carrier, the aerodynamic effect can be altered by adjusting the flow region for minimum impact of fluid on the body of the external tank of the system.

The use of the aerospike on an aerodynamically asymmetric vehicle, such as the space shuttle, is additionally advantageous in comparison to the use of the aerospike on symmetric vehicles. An asymmetric space vehicle system is not an optimum aerodynamic body of revolution, because it does not have an angle of attack during ascent which is essentially 0, as is the case with symmetric vehicles. Instead, the ascent of the space transportation system vehicle involves a complex thrust which comes from three off-axis space shuttle main engines and two off-axis solid rocket boosters which are located parallel to one another. This results in an ascent profile which changes its angle of attack during its ascent, through a variety of flow conditions, in order to attain its orbit. This distinction between the ascent of symmetric and asymmetric space vehicles renders the use of the aerospike much more critical in asymmetric space transportation systems, although it is also advantageous when used with symmetric systems. The injection of hydrogen or another gas or liquid into the flow region created by the aerospike will serve to retard or eliminate reattachment of the shock waves created by the space transportation system. Similarly, it is possible to use deicing liquid to reduce ice problems, or to inject water or other fluid to enhance transpiration cooling aspects of the vehicle during its ascent. Additionally, directed streams of fluid can be used to reduce the pressure on the vehicle and to reduce wing or vertical stabilizer loading upon ascent.

The above and other features of the present invention are illustrative only of preferred embodiments of the present invention, and it is obvious that a variety of modifications and changes may be made without departing from the intended scope of the invention.

What is claimed is:

1. An aerospike adapted to be attached to a nose of an aerodynamically asymmetrical space vehicle system, said aerospike comprising an elongated portion having a first end adapted to be attached to said nose and a second end distant from said nose, said aerospike further comprising a disc-shaped tip member with a substantially curved front surface which is integrally formed with said second end of said elongated portion, said elongated portion being rigid and comprising means for attaching said vehicle system to another object in space, said system further comprising a tether cord attached to said disc-shaped tip member, said tether cord and said tip together comprising means for attaching said vehicle system to another object in space, said elongated portion and said disc-shaped tip member together comprising means for reducing aerodynamic drag of said asymmetrical space vehicle system to which said aerospike is adapted to be attached during ascent of said vehicle into an orbital position.

2. An aerospike in accordance with claim 1 wherein said space vehicle system comprises a shuttle orbiter, an external tank, and two rocket boosters attached to outer walls of said external tank.

3. An aerospike in accordance with claim 2 wherein said orbiter is attached to a top portion of said external tank, said external tank including said nose, said orbiter having a flat nose similar to the nose of said tank, a second aerospike also being attached to said system, said aerospikes being identical and comprising means for causing interacting aerodynamic flow about said system.

4. An aerospike in accordance with claim 1 wherein said elongated portion is approximately fifteen to twenty-five feet long.

5. An aerospike in accordance with claim 1 wherein said nose terminates in a flat, generally annular portion.

6. An aerospike in accordance with claim 1 wherein said elongated portion and said tip member together comprise a lightning rod.

7. An aerospike in accordance with claim 1 wherein an essentially hollow, frustoconical cap member is positioned over said nose, the first end of said elongated portion being attached to one end of said frustoconical member.

8. An aerospike in accordance with claim 2 wherein said external tank has a blunt nose.

9. An aerospike in accordance with claim 1 further comprising means for emitting a fluid from said tip member to enhance aerodynamic flow about said space vehicle.

10. An aerospike in accordance with claim 9 wherein said fluid is a gas.

11. An aerospike in accordance with claim 9 wherein said fluid is a liquid.

12. An aerospike in accordance with claim 9 wherein said emitting means comprises means for retarding reattachment of shock waves created by movement of said space vehicle.

13. An aerospike in accordance with claim 9 wherein said emitting means includes a channel extending through said tip and through at least a part of said elongated portion.

14. An aerospike in accordance with claim 1 wherein said vehicle system is attached by said tether to a second vehicle reaction control system to comprise means for maneuvering said vehicles.

15. An aerospike in accordance with claim 1 wherein a swinging rendezvous module is attached to said tether.

16. An aerospike in accordance with claim 14 wherein a propellant recovery tank is attached to said tether.

17. An aerospike in accordance with claim 1 wherein said elongated portion is generally tapered from said nose to said tip member.

18. An aerospike in accordance with claim 1 in combination with said vehicle system, wherein said aerospike is attached to the nose of an aerodynamically asymmetrical space vehicle system.

19. An aerospike and a space vehicle system in accordance with claim 18, wherein said space vehicle system comprises a shuttle orbiter, an external tank, and two rocket boosters attached to outer walls of said external tank.

* * * * *